US010544299B2

(12) United States Patent
Nava et al.

(10) Patent No.: US 10,544,299 B2
(45) Date of Patent: Jan. 28, 2020

(54) VINYL-CONTAINING COMPOUNDS WITH HIGH HEAT DISTORTION

(71) Applicant: REICHHOLD LLC 2, Research Triangle Park, NC (US)

(72) Inventors: Hildeberto Nava, Cary, NC (US); Yongning Liu, Apex, NC (US)

(73) Assignee: Reichhold LLC 2, Research Triangle Park, NC (US)

( * ) Notice: Subject to any disclaimer, the term of this patent is extended or adjusted under 35 U.S.C. 154(b) by 585 days.

(21) Appl. No.: 14/090,453

(22) Filed: Nov. 26, 2013

(65) Prior Publication Data
US 2014/0171568 A1 Jun. 19, 2014

Related U.S. Application Data

(60) Provisional application No. 61/738,450, filed on Dec. 18, 2012.

(51) Int. Cl.
C08G 63/91 (2006.01)
C08L 67/02 (2006.01)

(52) U.S. Cl.
CPC .............. C08L 67/02 (2013.01); C08G 63/91 (2013.01); C08G 63/912 (2013.01); C08G 63/914 (2013.01)

(58) Field of Classification Search
CPC .... C08G 63/91; C08G 63/912; C08G 63/914; C08G 64/47
USPC ......................................................... 524/601
See application file for complete search history.

(56) References Cited

U.S. PATENT DOCUMENTS

| 3,367,992 | A | | 2/1968 | Bearden |
| 3,804,735 | A | | 4/1974 | Radlove et al. |
| 3,836,600 | A | | 9/1974 | Brewbaker et al. |
| 3,893,829 | A | | 7/1975 | Valentino |
| 3,947,422 | A | | 3/1976 | Tatum et al. |
| 3,948,698 | A | | 4/1976 | Elrick et al. |
| 4,014,771 | A | | 3/1977 | Rosenkranz et al. |
| 4,119,609 | A | | 10/1978 | Allen et al. |
| 4,134,884 | A | | 1/1979 | Takiyama et al. |
| 4,141,883 | A | | 2/1979 | Soma et al. |
| 4,310,708 | A | | 1/1982 | Strege et al. |
| 4,324,717 | A | | 4/1982 | Layer |
| 4,665,137 | A | | 5/1987 | Percec |
| 4,701,514 | A | | 10/1987 | Percec |
| 4,806,601 | A | | 2/1989 | Percec |
| 4,981,905 | A | * | 1/1991 | Simons .................. C08G 63/91 523/400 |
| 5,728,872 | A | | 3/1998 | Riemenschneider |
| 6,107,362 | A | | 8/2000 | Koniger et al. |
| 6,150,458 | A | | 11/2000 | Weikard et al. |
| 6,153,788 | A | | 11/2000 | Fischer et al. |
| 6,187,442 | B1 | | 2/2001 | Lane et al. |
| 6,200,460 | B1 | | 3/2001 | Sutoris et al. |
| 6,228,688 | B1 | | 5/2001 | Ohta et al. |
| 6,572,783 | B1 | * | 6/2003 | Cai ........................ A23L 3/3436 252/188.28 |
| 6,835,786 | B2 | | 12/2004 | Ishii et al. |
| 7,388,057 | B2 | | 6/2008 | Amagai et al. |
| 7,781,537 | B2 | | 8/2010 | Birsak et al. |
| 8,039,559 | B2 | | 10/2011 | Jansen et al. |
| 9,068,045 | B2 | * | 6/2015 | Nava ........................ C08L 67/06 |
| 2005/0277745 | A1 | | 12/2005 | Walrath et al. |
| 2009/0076218 | A1 | | 3/2009 | Zhao et al. |
| 2009/0197094 | A1 | | 8/2009 | Nakahara et al. |
| 2011/0172359 | A1 | | 7/2011 | Panther |
| 2011/0207950 | A1 | | 8/2011 | Nava et al. |

FOREIGN PATENT DOCUMENTS

| EP | 0054105 A1 | 6/1982 |
| EP | 0126341 A2 | 4/1984 |
| WO | WO 90/12824 A1 | 11/1990 |
| WO | WO 01/40149 A1 | 6/2001 |
| WO | WO 01/40404 A1 | 6/2001 |
| WO | WO 01/42313 A1 | 6/2001 |
| WO | WO 03/093384 A1 | 11/2003 |
| WO | WO 2008/119973 A1 | 10/2008 |

OTHER PUBLICATIONS

Notification of Transmittal of the International Searching Report and the Written Opinion of the International Searching Authority, or the Declaration corresponding to International Application No. PCT/US2013/073027 dated Mar. 27, 2014.
Notification Concerning Transmittal of International Preliminary Report on Patentability corresponding to International Application No. PCT/US2013/073027 dated Jul. 2, 2015.
Notification Concerning Transmittal of International Preliminary Report on Patentability corresponding to PCT Application No. PCT/US2011/024970 dated Sep. 7, 2012.
Dr Hans-Jurgen Reinhardt, Inerting in the chemical industry, Apr. 2010, pp. 1-16, Hydrocarbon Processing.
Notification of Transmittal of the International Search Report and the Written Opinion of the International Searching Authority, or the Declaration corresponding to International Patent Application No. PCT/US2011/024970 dated Jun. 7, 2011.

(Continued)

Primary Examiner — Jane L Stanley

(74) Attorney, Agent, or Firm — Neal, Gerber & Eisenberg LLP

(57) ABSTRACT

A process for forming a thermosetting resin in a nitrogen atmosphere is provided. The process includes the steps of a) reacting a polycarboxylic acid and/or anhydride and a polyhydric alcohol to provide a hydroxyl-containing intermediate; b) reacting the hydroxyl-containing intermediate with a vinyl-containing organic acid or vinyl containing alkyl ester in the presence of an esterification catalyst, a polymerization inhibitor and an azeotropic agent; and c) reacting any residual vinyl-containing organic acid and residual esterification catalyst with an epoxide.

34 Claims, No Drawings

(56) References Cited

OTHER PUBLICATIONS

Fisher 1; Isooctane Material Safety Data Sheet, Jun. 22, 2009, p. 1-8.
Fisher 2; Cyclohexane Material Safety Data Sheet, Oct. 6, 2009, p. 1-8.
Linde; White Paper: Gas applications in fine and specialty chemistry, Apr. 4, 2008, p. 10-11.

* cited by examiner

VINYL-CONTAINING COMPOUNDS WITH HIGH HEAT DISTORTION

CROSS-REFERENCE TO RELATED APPLICATIONS

This application claims priority from U.S. Provisional Application Ser. No. 61/738,450, filed Dec. 18, 2012, the disclosure of which is hereby incorporated by reference herein in its entirety.

FIELD OF THE INVENTION

The present invention relates to compositions and processes for preparing vinyl containing compounds having high heat distortion temperature.

BACKGROUND OF THE INVENTION

Ceramic and metal matrix composites are common materials that have the ability to tolerate extreme temperatures and high mechanical loads. However, industry often prefers polymeric resin systems as compared to ceramic or metals because polymers in general perform better under fatigue compared to ceramics and are much lighter than most metals. To this end, so-called high performance polymers are often used. These high performance polymers typically have aromatic and/or heterocyclic repeat units along the backbone that in general make the product more rigid. The low mobility of the aromatic/heterocyclic repeat segments provides a high heat distortion temperature or heat deflection temperature (HDT) and excellent heat stability resulting in excellent property retention at elevated temperatures. In addition, higher aromaticity in a polymer will require higher energy to thermally degrade the backbone resulting in more desired char formation during thermal decomposition. HDT is an essential property that allows a particular thermosetting system to be suitable for a specific application. This property is mainly dictated by the crosslink density and chemical structure of the polymer. HDT may be increased by increasing the number of reactive moieties on the polymer or copolymerizable monomer(s) that may be participating in the resin system, affording a higher crosslink density of the finished product. However, it is important to control the amount of crosslinking since the final properties of the product will depend on the crosslink density. As the crosslink density increases, the finished product becomes more brittle making it unusable for certain applications.

It is important to have the most appropriate balance between crosslink density and chemical structure to afford the desired properties when the resins are used alone or combined with fillers, reinforcements, polymers or other additives. Therefore, in addition to HDT, mechanical properties which may include flexural strength, tensile strength, elongation and compression strength are important to prepared products that may find applications in aerospace, automobile, construction, boat building, infrastructure, electric and electronic.

However such high aromaticity may also be a disadvantage due to such polymers having poor solubility in common solvents, as well as difficult processability due to these polymers having high melting points and viscosities. To overcome these problems, the molecular weight of the polymers have high aromaticity is often decreased; unfortunately, this approach results in a significant loss of their final physical properties. To resolve this disadvantage, polymeric intermediates with low molecular weight and reactive functional groups have been developed. The reactive functional groups have the ability to undergo crosslinking reactions and after they are reacted the resin becomes infusible and insoluble improving the ultimate physical properties.

In the last four decades, several thermosetting resins have been developed to handle moderate to high temperatures and tough conditions, providing and appropriate weight to load ratios and cost savings. A wide range of polymers and oligomeric materials are available which include maleimides, cyanate esters, phenolics, aromatic polyethers, polysulfones and polyketones. Some of these materials are able to incorporate HDT, impact strength, toughness, low flammability, hydrolytic stability, chemical and solvent resistance and dielectric properties. The properties accomplished from these materials can provide composite systems that can be used in various applications which can include molding, lamination, infusion, pultrusion, encapsulation, coatings, adhesives, electrical and electronic components.

Much attention has recently been given to thermosetting systems that can be cured thermally or via free radical polymerization to achieve high thermal stability and excellent properties. Among these types of resin systems include polysulfones such as those described in U.S. Pat. Nos. 4,701,514 and 4,806,601. The resins described therein have terminal and/or pendant vinyl containing groups that can be polymerized either thermally or via free radical polymerization. The polymers are aromatic and it is necessary to use polar aprotic solvents that require multiple dissolving and precipitation cycles in order to remove them from the polymerization mixture. The polymers have glass transition temperatures ($T_g$) from about 170° C. for a molecular weight of about 1000 to a glass transition above 200° C. for molecular weights higher than 5,000.

U.S. Pat. No. 4,665,137 describes the preparation of difunctional polyphenylene oxide. The polymers are prepared with various molecular weights in the range from about 1,000 to about 5,000 containing styrene end groups. The glass transition temperature of these polymeric systems is higher than 200° C. after curing. Multiple steps are necessary for the preparation of these thermosetting polymers including several washing steps to remove the byproducts and unreacted materials.

U.S. Pat. Nos. 6,835,786, 7,388,057, and 7,781,537 describe the preparation of polyphenylene oxide containing terminal and/or pendant methacrylate groups. Various vinyl type monomers are also proposed and provide systems that are cured with peroxide affording crosslinked systems with glass transition temperatures ranging from about 140° C. to over 200° C. Various steps are described in the preparation of the crosslinkable polymers which include solvent processing and removal.

U.S. Publication No. 2011/0172359 and WO2008/119973 describe the preparation and crosslinking of polyfunctional urethanes containing at least three to six ethylenically unsaturated groups in combination with a crosslinkable monomer having at least two ethylenically unsaturated groups. The preparation of these thermosetting systems requires the use of toxic isocyanates that can easily react with moisture and alter their reactivity.

U.S. Publication No. 2011/0207950 describes ethylenically unsaturated crosslinkable systems that are substantially free of any vinyl unsaturated monomer. The reactive components show good properties after crosslinking, however, HDT values are below 120° C.

Thus there remains the need to prepare thermosetting resin systems that may include excellent processability, high HDT, good mechanical properties, curable by a simple process that may include thermal, free radical room temperature polymerization or at moderate temperatures, UV, electron beam or radiation. In addition, it would be advantageous to have a simple and affordable process that would yield products free of potentially toxic or harmful components in the resulting thermosetting materials.

SUMMARY OF THE INVENTION

In one aspect, embodiments disclosed herein relate to a thermosetting resin, including the reaction product of a vinyl containing material, wherein the vinyl containing material may include aromatic as well as aliphatic components; wherein the reaction product has an HDT value of greater than 150° C., preferably greater than or equal to 180° C., most preferably greater than or equal to 200° C.

In another aspect, embodiments disclosed herein relate to a process for forming a thermosetting resin, in a nitrogen atmosphere, the steps including: a) reacting a polycarboxylic acid and/or anhydride and a polyhydric alcohol to provide a hydroxyl-containing intermediate; b) reacting the hydroxyl-containing intermediate with a vinyl-containing organic acid or vinyl containing alkyl ester in the presence of an esterification catalyst, a polymerization inhibitor and an azeotropic agent; and c) reacting any residual vinyl-containing organic acid and residual esterification catalyst with an epoxide, wherein all the process steps are performed in a nitrogen atmosphere to result in a thermosetting resin that has an HDT value of greater than 150° C., preferably greater than or equal to 180° C., most preferably greater than or equal to 200° C.

The resulting product has good thermal and mechanical properties, and may be cured using a simple process that may include thermal, free radical polymerization at room temperature or at moderate temperatures, UV, electron beam or radiation. For example, the resulting reaction product has an HDT value of greater than 150° C., preferably greater than or equal to 180° C., most preferably greater than or equal to 200° C.

Other aspects and advantages will be apparent from the following description and the appended claims.

DETAILED DESCRIPTION OF THE INVENTION

The invention is described more fully hereinafter. This invention may, however, be embodied in many different forms and should not be construed as limited to the embodiments set forth herein. Rather, these embodiments are provided so that this disclosure will be thorough and complete, and will fully convey the scope of the invention to those skilled in the art.

The terminology used herein is for the purpose of describing particular embodiments only and is not intended to be limiting of the invention. As used herein, the singular forms "a," "an," and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items. As used herein, phrases such as "between X and Y" and "between about X and Y" should be interpreted to include X and Y. As used herein, phrases such as "between about X and Y" mean "between about X and about Y." As used herein, phrases such as "from about X to Y" mean "from about X to about Y."

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

"Substituted" as used herein to describe chemical structures, groups, or moieties, refers to the structure, group, or moiety comprising one or more substituents. As used herein, in cases in which a first group is "substituted with" a second group, the second group is attached to the first group whereby a moiety of the first group (typically a hydrogen) is replaced by the second group. The second group may contain one or more further substitutions itself, wherein said further substitutions may be the same or different.

Typical substituents found in substitutions include, but are not limited to, nonhydrogen atoms (e.g., halogens), functional groups (such as, but not limited to, amino, sulfhydryl, carbonyl, hydroxyl, alkoxy, carboxyl, silyl, silyloxy, phosphate and the like), hydrocarbyl groups, and hydrocarbyl groups substituted with one or more heteroatoms. Further exemplary substitutions include, but are not limited to, alkyl, lower alkyl, halo, haloalkyl, alkenyl, alkynyl, cycloalkyl, cycloalkylalkyl, heterocyclo, heterocycloalkyl, aryl, arylalkyl, lower alkoxy, thioalkyl, hydroxyl, thio, mercapto, amino, imino, halo, cyano, nitro, nitroso, azido, carboxy, sulfide, sulfone, sulfoxy, phosphoryl, silyl, silylalkyl, silyloxy, boronyl, and modified lower alkyl.

As discussed above, the process for forming the thermosetting resin is conducted in a nitrogen atmosphere. The process includes the steps of: a) reacting a polycarboxylic acid and/or anhydride and a polyhydric alcohol to provide a hydroxyl-containing intermediate; b) reacting the hydroxyl-containing intermediate with a vinyl-containing organic acid or vinyl containing alkyl ester in the presence of an esterification catalyst, polymerization inhibitors and an azeotropic agent; and c) reacting residual esterification catalyst and residual vinyl-containing organic acid with an epoxide wherein all the process steps are performed in a nitrogen atmosphere to result in a reaction product that has an HDT value of greater than 150° C., preferably greater than or equal to 180° C., most preferably greater than or equal to 200° C.

In accordance with embodiments of the present invention, hydroxy-containing intermediates are prepared by the condensation of polycarboxylic acid or anhydrides with polyhydric alcohols in a nitrogen atmosphere. Anhydrides that can be employed in the making are preferably cyclic or acyclic, saturated or unsaturated. In a "cyclic" anhydride, the anhydride functionality is contained within a ring, such as in phthalic anhydride and maleic anhydride. "Saturated" anhydrides contain no ethylenic unsaturation, although they may contain aromatic rings. Phthalic anhydride and succinic anhydride are examples of saturated anhydrides. "Unsaturated" anhydrides contain ethylenic unsaturation. This unsaturation typically becomes incorporated into the hydroxyl containing intermediates, and form part of the crosslinking of the thermosetting resin. Examples include maleic anhydride, itaconic anhydride, and the like.

Specific examples of suitable anhydrides include, but are not limited to, propionic anhydride, maleic anhydride, phthalic anhydride, tetrabromophthalic anhydride, succinic anhydride, tetrahydrophthalic anhydride, citraconic anhydride, itaconic anhydride, and aryl- (e.g., including, but not limited to a substituted or unsubstituted monocyclic carbocyclic ring system or a bicyclic carbocyclic fused ring system or higher having one or more aromatic rings), alkyl- (e.g., including, but not limited to a substituted or unsubstituted straight or branched chain hydrocarbon containing from 1 to 30 carbon atoms), and halogen-substituted derivatives of the above. Mixtures of these anhydrides may be used. The selection of the amounts of polyether and anhydride that may be used can be determined by the end user, and may depend, for example, upon the types of physical properties or degree of crosslinking that is desired.

Specific examples of dicarboxylic acids include but are not limited to, fumaric acid, isphthalic acid, terephthalic acid, adipic acid, cyclohexane dicarboxylic acid, succinic acid, adipic acid, sebacic acid, azealic acid, malonic acid, alkenyl (e.g., including, but not limited to a straight or branched chain hydrocarbon containing from 1 to 30 carbon atoms (or in loweralkenyl 1 to 4 carbon atoms) which include 1 to 10 double bonds in the hydrocarbon chain) succinic acids such as n-dodecenylsuccinic acid, docecylsuccinic acid, octadecenylsuccinic acid, and anhydrides thereof. Lower alkyl (e.g., including, but not limited to a $C_1$-$C_4$, linear or branched, saturated or unsaturated alkyl, such as methyl, ethyl, ethenyl, n-propyl, iso-propyl, 1-propenyl, 2-propenyl, n-butyl, iso-butyl, tert-butyl, and the like) esters of any of the above may also be employed. Mixtures of any of the above are suitable.

Additionally, polycarboxylic acids or anhydrides thereof having not less than three carboxylic acid groups may be employed. Such compounds include 1,2,4-benzenetricarboxylic acid, 1,3,5-benzene tricarboxylic acid, 1,2,4-cyclohexane tricarboxylic acid, 2,5,7-naphthalene tricarboxylic acid, 1,2,4-naphthalene tricarboxylic acid, 1,3,4-butane tricarboxylic acid, 1,2,5-hexane tricarboxylic acid, 1,3-dicarboxyl-2-methyl-2-carboxymethylpropane, tetra(carboxymethyl)methane, 1,2,7,8-octane tetracarboxylic acid, and mixtures thereof.

In accordance with embodiments of the present invention, a wide range of polyhydric alcohols may be used in the method of the invention, the selection of which can be determined by one skilled in the art. It is preferred that these alcohols have sufficiently high boiling points such that themselves and their corresponding esters formed therefrom are not volatilized and lost under the reaction condition. The alcohols may include, but are not limited to, ethylene glycol, diethylene glycol, neopentyl glycol, dibromoneopentyldiol, 2-methyl-1,3-propanediol, 2,2,4-trimethyl-1,3pentadiol, 2-butyl-2ethyl-1,3-propanediol, polyethoxylated bisphenol "A," polypropoxylated Bisphenol "A," 1,4-cyclohexane dimenthanol, trimethylol propane diallylether, propylene glycol, dipropylene glycol, 1,3-butanediol, 1,4-butanediol, 1,3 hexanediol, 1,3-butylene glycol, 1,6-hexanediol, hydrogeneated bisphenol "A," 1,4-cyclohexanol, ethylene oxide adducts of bisphenols, propylene oxide adducts of bisphenols, sorbitol, 1,2,3,6-hexatetrol, 1,4-sorbitan, pentaerythritol, dipentaerythritol, tripentaerythritol, sucrose, 1,2,4-butanetriol, 1,2,5-pentanetriol, glycerol, 2-methyl-propanetriol, 2-methyl-1,2,4-butanetriol, trimethylol ethane, trimethylol propane, and 1,3,5-trihydroxyethyl benzene. Halogen or phosphorus containing derivatives of the above may also be employed. Mixtures of the above alcohols may be used.

Optionally, monofuctional alcohols may be included as an option to modify the crosslinking density on the thermosetting resin. The monoalcohols include but are not limited to, n-butanol, n-hexanol, octanol, undecanol, dodecanol, cyclohexylmethanol, benzyl alcohol, phenoxy ethanol, alky and aryl monoalkohols and the like.

According to some embodiments of the present invention, various amounts of the weight equivalent ratio of polycarboxylic acid or anhydride to polyhydric alcohols may be employed. Preferably, the weight equivalent ratio of polycarboxylic acid or anhydride to polyhydric alcohol ranges from about 1:1 to about 1:10, and more preferably from about 1:1.5 to about 1:2.5.

Polymerization inhibitors may also be included in the polymerization mixture such as phenothiazine, phenol, 2,6-di-tert-butyl-4-methyl phenol, hydroquinone (HQ), tolu-hydroquinone (THQ), bisphenol "A" (BPA), triphenyl antimony, naphthoquinone (NQ), p-benzoquinone (p-BQ), butylated hydroxy toluene (BHT), hydroquinone monomethyl ether (HQMME), 4-ethoxyphenol, 4-propoxyphenol, and propyl isomers thereof, monotertiary butyl hydroquinone (MTBHQ), ditertiary Butyl hydroquinone (DTBHQ), tertiary butyl catechol (TBC), 1,2-dihydroxybenzene, 2,5-dichlorohydroquinone, 2-acetylhydroquinone, 1,4-dimercaptobenzene, 2,3,5-trimethylhydroquinone, 2-aminophenol, 2-N,N,-dimethylaminophenol, catechol, 2,3-dihydroxyacetrophenone, pyrogallol, 2-methylthiophenol. Other substituted and un-substituted phenols and mixtures of the above.

Other polymerization inhibitors may include stable hindered nitroxyl compounds such as N,N-di-tert-butylnitroxide; N,N-di-tert-amylnitroxide; N-tert-butyl-2-methyl-1-phenyl-propylnitroxide; N-tert-butyl-1-diethyl phosphono-2,2-dimethyl propyl nitroxide; 2,2,6,6-tetramethyl-piperidinyloxy; 4-amino-2,2,6,6-tetramethyl-piperidinyloxy; 4-hydroxy-2,2,6,6-tetramethyl-piperidinyloxy; 4-oxo-2,2,6,6-tetramethyl-piperidinyloxy; 4-dimethylamino-2,2,6,6-tetramethyl-piperidinyloxy; 4-ethanoyloxy-2,2,6,6-tetramethyl-piperidinyloxy; 2,2,5,5-tetramethylpyrrolidinyloxy; 3-amino-2,2,5,5-tetramethyl-pyrrolidinyloxy; 2,2,4,4-tetramethyl-1-oxa-3-azacyclopentyl-3-oxy; 2,2,4,4-tetramethyl-1-oxa-3-pyrrolinyl-1-oxy-3-carboxylic acid; 2,2,3,3,5,5,6,6-octamethyl-1,4-diazacyclohexyl-1,4-dioxy; 4-bromo-2,2,6,6-tetramethyl-piperidinyloxy; 4-chloro-2,2,6,6-tetramethyl-piperidinyloxy; 4-iodo-2,2,6,6-tetramethyl-piperidinyloxy; 4-fluoro-2,2,6,6-tetramethyl-piperidinyloxy; 4-cyano-2,2,6,6-tetramethyl-piperidinyloxy; 4-carboxy-2,2,6,6-tetramethyl-piperidinyloxy; 4-carbomethoxy-2,2,6,6-tetramethyl-1-piperidinyloxy; 4-carbethoxy-2,2,6,6-tetramethyl-piperidinyloxy; 4-cyano-4-hydroxy-2,2,6,6-tetramethyl-piperidinyloxy; 4-methyl-2,2,6,6-tetramethyl-1-piperidinyloxy; 4-carbethoxy-4-hydroxy-2,2,6,6-tetramethyl-piperidinyloxy; 4-hydroxy-4-(1-hydroxypropyl)-2,2,6,6-tetramethyl-piperidinyloxy; 4-methyl-2,2,6,6-tetranlethyl-1,2,5,6-tetrahydropyridinyloxyl, and the like. Additional useful stable hindered nitroxyl inhibitors are described on patent publications WO 01/40404 A1, WO01/40149 A2, WO 01/42313 A1, U.S. Pat. Nos. 4,141,883, 6,200,460 B1, 5,728,872, incorporated here in their entirety.

According to some embodiments of the present invention, various amounts of inhibitors may be employed. The inhibitors may range from about 0.001 to about 0.5 percent based on the weight of the reactants, and often from about 0.04 to about 0.1 percent by weight.

Any number of esterification acid catalysts may be used for the purposes of the invention. Acid catalysts include, but are not limited to, strong protic acids and Lewis acids. Examples of acid catalysts are sulfuric acid, hydrochloric acid, alkyl sulfonic acids, 2-methyl-1-phenol-4-sulfonic acid, alkylbenzene sulfonic acids, and mixtures thereof. Toluenesulfonic acid, benzenesulfonic acid, xylenesulfonic acid, and methanesulfonic acid are preferably employed. In general, sulfur-containing acid catalysts are preferably employed. Mixtures of any of the above may also be used. These catalysts may be added during the preparation of the hydroxyl containing intermediate or after its preparation.

Optionally, a number of metal containing catalysts may be added such as organo tin catalyst like dimethyl tin oxide, dibutyl tin diacetate, dibutyl tin di-2-ethylhexoate, dibutyl tin dilaurate, dibutyl tin oxide, dimethyl tin dichloride, sodium and potassium alkoxides, zinc and titanium alkoxides and the like.

According to some embodiments of the present invention, various amounts of catalyst may be employed. Preferably, the catalyst ranges from about 0.1 to about 5 percent based on the weight of the reactants, and more preferably from about 0.3 to about 1 percent by weight.

According to some embodiments of the present invention, the resulting hydroxyl-containing intermediate is reacted with a vinyl-containing organic acid in the presence of an esterification catalyst, polymerization inhibitors and an azeotropic agent to provide a vinyl containing thermosetting resin. An azeotropic agent is present to facilitate removal of water generated during this reaction. The vinyl containing organic acid is present in a molar excess relative to the alcohol and carrying the reaction in a nitrogen atmosphere. In the present application, nitrogen may be passed through or sparged through the reaction mixture. This is in contrast to providing a nitrogen blanket to reduce combustibility due to oxygen or other volatiles in the reaction mixture vapor space. By sparging nitrogen into the reaction mixture, side reactions between the reactants and air can be reduced or eliminated. As soon as the esterification reaction of the vinyl containing organic acid is accomplished, an epoxy intermediate is added to react any excess of vinyl containing organic acid present in the mixture, and the excess esterification catalyst. Preferably, the unreacted organic acid and excess esterification acid catalyst are completely consumed by the process of the invention.

The vinyl containing organic acid that may be used in accordance with the invention may be selected from any number of acids that are used in esterification reactions. Typically, acids having at least two or more carbon and oxygen atoms may be used. Examples of these acids include, but are not limited to, acrylic or methacrylic acids, cinnamic acid, and crotonic acid, as well as mixtures of the above. Hydroxyalkyl acrylate or methacrylate half esters of dicarboxylic acids can also be utilized, and particularly those having from two to six carbon atoms. Examples of these compounds are described in U.S. Pat. No. 3,367,992, the disclosure of which is incorporated herein by reference in its entirety. The organic acid and alcohol may be selected in various amounts relative to one another. Preferably, these materials are used such that the weight equivalent ratio of organic acid to alcohol ranges from about 1:1 to about 10:1, and more preferably from about 1:1 to about 2:1 by weight.

According to some embodiments of the present invention, an azeotropic agent is employed to facilitate removal of water generated during the reaction between the vinyl containing organic acid and the hydroxyl terminated intermediate. In some embodiments, the azeotropic agent is a solvent. Preferably, the azeotropic solvents having a boiling point ranging from about 70° C. to about 120° C. Examples of the azeotropic agent include, but are not limited to, hydrocarbons such as toluene, xylene, hexanes, and cyclohexane. The azeotropic solvent may be used in varying amounts ranging from about 5 to about 50 percent based on the weight of the total reaction mixture. Preferably, the azeotropic solvent is used in an amount ranging from about 10 to about 30 percent by weight.

According to some embodiments, the esterification is carried out in Nitrogen and at atmospheric, subatmospheric or reduced pressure.

According to some embodiments of the present invention, upon completion of the reaction between the vinyl containing organic acid such as methacrylic acid or acrylic acid and the hydroxyl-containing intermediate, the azeotropic solvent is removed by vacuum distillation. It should be appreciated, however, that the azeotropic agent may be removed during other stages of the invention. The resulting reaction mixture typically contains vinyl containing thermosetting resin, unreacted vinyl containing organic acid and an esterification acid catalyst. The reactor is then charged with an epoxide(s) to consume the excess organic acid and the acid catalyst. Any number of epoxide(s) can be used for the purpose of the invention. In an embodiment, the epoxide is a liquid. In other embodiments, the epoxide(s) may be a polyepoxide(s). Preferably the polyepoxide(s) include but are not limited to glycidyl methacrylate, glycidyl ethers and polyethers of both polyhydric alcohols and polyhydric phenols, bisphenol A epoxy, bisphenol F epoxy, glycidyl ester of neodecanoic acid, flame retardant epoxy resins based on tetrabromo bisphenol A, epoxy novolacs, epoxidized fatty acids or drying oil acids, epoxidized diolefins, epoxidized unsaturated acid esters as well as epoxidized unsaturated polyesters. Mixtures of the above may be employed. The polyepoxides may be monomeric or polymeric. Particularly preferred polyepoxides are glycidyl ethers of polyhydric alcohols or polyhydric phenols having equivalent weights per epoxide groups ranging from about 150 to about 1500, more preferably from about 150 to about 1000.

The epoxy component can be used in varying amounts according to some embodiments of the present invention. As an example, an epoxide may be reacted with an acid in a proportion of about 1 equivalent of epoxide per each equivalent of acid. The term "acid" in the preceding sentence encompasses excess esterification catalyst and unreacted vinyl containing organic acid. The epoxy may be used ranging from about 1 to about 15 percent based on the weight of the reactants. Preferably, the epoxy is used in an amount ranging from about 3 to about 6 percent by weight. Such polyepoxides are disclosed in U.S. Pat. Nos. 3,804,735; 3,893,829; 3,948,698; 4,014,771; and 4,119,609, and Lee and Naville, *Handbook of Epoxy Resins*. Chapter 2, McGraw Hill, New York (1967).

In the event that an epoxide is employed, a second catalyst may optionally be used to catalyze the reactions between the epoxide and: (1) unreacted organic acid and (2) esterification acid catalyst. A number of catalysts may be employed for this purpose. Exemplary catalysts include, but are not limited to, organophosphonium salts, and tertiary amines such as 2,4,6-tri(dimethylaminomethyl)phenol [DMP-30] and the like. Tertiary amines and quaternary ammonium salts may be used. Examples include, but are not limited to, tetramethylammonium chloride tetramethylammonium hydroxide, tetramethylammonium bromide, tetramethylammonium hydrogensulfate, benzyltrimethylammonium chloride, benzyltrimethylammonium bromide, benzyltrimethylammonium hydrogen sulfate, benzyltributylammonium chloride, benzyltributylammonium bromide, benzyltributylammonium hydrogen sulfate, 1,4-diazabicyclo[2.2.2]octane, diazabicyclo[4.3.0]-nonene-(5), 2-methyl imidazol, piperidine, morpholine, triethyl amine, tributyl amine, and the like. Mixtures of the above may also be employed.

Phosphorous containing compounds may also be used as a catalyst involving the epoxide. Examples include, but are not limited to, triphenyl phosphine, tributyl phosphine, tributylphosphonium acetate, tributylphosphonium bromide, tributylphosphonium chloride, tributylphosphonium fluoride, tributylphosphonium iodide, tetraphenylphosphonium chloride, tetraphenylphosphonium bromide, tetraphenylphosphonium acetate, and phosphine salts as those described in U.S. Pat. No. 4,310,708, the disclosure of which is incorporated herein by reference in its entirety.

The reaction involving the epoxide is preferably carried out at a temperature ranging from about 15° C. to about 120° C., and more preferably from about 30° C. to about 80° C.

Other components may be employed in accordance with the present invention. Examples of components include, but are not limited to, polymerization inhibitors, free radical scavengers, and antioxidants. These materials can be used to minimize the loss of organic acid or esters formed during the method due to the occurrence of unfavorable side reactions.

The method of the invention may be carried out using known and existing equipment. The method may take place in various vessels or reactors, the selection known to those skilled in the art. Preferably, the vessel or reactor is fabricated from equipment that is inert under the conditions of the reaction such as, but not limited to, glass, carbon steel, stainless steel, and the like. A conventional reactor equipped with a reflux set up and vacuum is typically employed. The reactor or vessel may employ an agitator for stirring the contents of the reactor, and may also employ a heater which may encompass, but is not limited to, a heat lamp, a heating mantle, an oil bath, and the like.

The final composition of the mixture upon completion includes various vinyl-containing reaction products. Preferably, the composition comprises an esterified intermediate (e.g., a polyfunctional acrylic or methacrylic ester compound). These reaction products mentioned above have vinyl functionality which enables them to be able to react with other compounds as desired by one who is skilled in the art. In an embodiment, the viscosity of such a resin may be high, and these resins may be diluted to prepare, for example, laminates, prepregs, glass reinforced plastic pipe, and reinforced molded parts. In another embodiment, the viscosity of such a resin may be low, and thus the resin can be used as a blending agent with other thermosetting resins such as unsaturated polyesters, vinyl esters, polyurethane acrylates or methacrylates, and isocyanurate acrylate or methacrylates to reduce their volatile monomer content and potentially improve their properties.

A vinyl monomer may also be included as a diluent with the vinyl-containing reaction products of the invention. Suitable monomers may include those such as, for example, styrene and styrene derivatives such as alpha-methyl styrene, p-methyl styrene, divinyl benzene, divinyl toluene, ethyl styrene, vinyl toluene, tert-butyl styrene, monochloro styrene, dichlorostyrene, trichlorostyrene, bromostyrene, dibromostyrene, tribromostyrene, fluorostyrene, difluorostyrene, trifluorostyrene, tetrafluorostyrene and pentafluorostyrene, halogenated alkylstyrenes such as chloromethylstyrene, alkoxystyrenes such as paramethoxy styrene. Monounsaturated compounds maybe used alone or in combination.

Other monomers which may be used include allylic compounds containing more than one allyl group per molecule. For example, diallyl phthalate, diallyl itaconate, diallyl maleate, triallylmellitate, triallylmesate, triallylisocyanurate, triallycyanurate, and partial polymerization products prepared therefrom.

Other unsaturated compounds also include (meth)acrylates and acrylamides. For example, methyl (meth)acrylate, ethyl (meth)acrylate, propyl (meth)acrylate, hexyl (meth) acrylate, octyl (meth)acrylate, cyclohexananol (meth)acrylate, phenoxyethyl (meth)acrylate, hydroxyethyl (meth) acrylate, hydroxypropyl (meth)acrylate, and mixtures thereof.

Any suitable polyfunctional acrylate may be used in the resin composition. Such compounds include ethylene glycol di(meth)acrylate, butanediol di(meth)acrylate, hexanediol di(meth)acrylate, ethoxylated trimethylolpropane tri(meth) acrylate, trimethylolmethane tetra(meth)acrylate, pentaerythritol tetra(meth)acrylate, dipentaerythritol tetra(meth) acrylate, dipentaerythritol penta(meth)acrylate, dipentaerythritol hexa(meth)acrylate, ethoxylated polyhydric phenol di(meth)acrylates containing from 1 to 30 ethylene oxide units per OH group in the phenol, propoxylated polyhyric phenol dia(meth)crylates and di(meth)acrylates containing from 1 to 30 propylene oxide groups per OH groups in the phenol. Examples of some useful di- and polyhydric phenols include catechol; resorcinol; hydroquinone; 4,4'-biphenol; 4,4'-ispropylidenebis(o-cresol); 4,4'-isopropylidenebis(2-phenyl phenol); alkylidenediphenols such as bisphenol "A"; pyrogallol; phloroglucinol; naphthalene diols; phenol; formaldehyde resins; resorcinol/formaldehyde resins; and phenol/resorcinol/formaldehyde resins. Halogen or phosphorus containing intermediates of the above may also be employed. Mixtures of the above mono-, di- and poly(meth) acrylates may also be employed.

The vinyl monomers and polyfunctional (meth) acrylates may be used in varying amounts, preferably from about 0 to 50% based on the weight of the components which may be dissolved therein, and more preferably from about 0 to 30% weight percent.

The vinyl-containing reaction products of the invention may be used in combination with other thermosetting resins such as polyesters, vinyl esters and suitable monomeric components to form a liquid resin. The liquid resin may be employed, for example, as a laminating resin, molding resin, or a gel coat resin as a coating on a suitable substrate. A number of substrates may be employed such as, for example, a marine vessel, a vehicle, or an aircraft.

The reactive vinyl-containing reaction products of the invention and/or their mixtures may include an initiator to aid in the curing (crosslinking) of the resin. A number of initiators may be employed, such as, for example, an organic peroxide. Exemplary organic peroxides that may be used include, for example, one or more of cumene hydroperoxide; methyl ethyl ketone peroxide; benzoyl peroxide; 2,4-pentanedione peroxide; 2,5-dimethylhexane-2,5-dihydroperoxide; tert-butyl peroxybenzoate; di-tert-butyl perphthalate; dicumyl peroxide; 2,5-dimethyl-2,5-bix(tert-butylperoxide) hexane; 2,5-dimethyl-2,5-bis(tert-butylperoxy)hexyne; bis (tert-butylperoxyisopropyl)benzene; ditert-butyl peroxide; 1,1-di(tert-amylperoxy)-cyclohexane; 1,1-di-(tert-butylperoxy)-3,3,5-trimethylcyclohexane; 1,1-di-(tert-butylperoxy)-cyclohexane; 2,2-di-(tert-butylperoxy)butane; n-butyl-4,4-di(tert-butylperoxy)valerate; ethyl-3,3-di-(tert-amylperoxy) butyrate; ethyl-3,3-di(tert-butylperoxy)-butyrate; t-butyl peroxy-neodecanoate; di-(4-5-butyl-cyclohexyl)-peroxydicarbonate; lauryl peroxide; 2,5-dimethyl-2,5-bis(2-ethylhexanoyl peroxy) hexane; t-amyl peroxy-2-ethylhexanoate; 2,2'-azobis(2-methylpropionitrile); 2,2'-azobis(2,4-methylbutanenitrile); and the like. Mixtures of any of the above may be used. The agent is preferably employed in an amount from about 0.2 to 3.0 percent based on the weight of the resin, more preferably from about 1 to 1.5 percent by weight, and most preferably from about 0.5 to 1.25 percent by weight.

Suitable curing accelerators or promoters may optionally be used in conjunction with the initiator and include, for example, one or more salts of metals chosen from among lithium, copper, vanadium, zirconium, titanium, nickel, magnesium, iron, sodium, potassium, manganese and cobalt, in combination with one or more compounds of, organo-nitrogenated type and alkyl organic acids, halides, nitrates to form a coordination compound. Any skill in the art can choose a metal salt comprising a combination of transition metal salts. This means e.g. one kind of transition metal but different coordination ions or ligands; different transition metal ions and one kind of coordinating ions or ligands; and combinations of these. The accelerator may be added in several different manners. For example, the accelerator may be pre-mixed to form a metal salt complex prior to it being added to the resin composition. Another possibility is to add the individual components of the accelerator composition to the resin and form the metal complex in situ. The most preferred method will depend on the specific curing process being carried out. Examples of the metal salts are described for example in patents WO9012824A1, WO03093384A1, U.S. Pat. No. 8,039,559 (B2); the disclosures of which are incorporated herein by reference in their entirety. It is noted in one embodiment, because of environmental and toxicity concerns, particularly in Europe, the use of cobalt is avoided and thus the metal salt is not a cobalt salt.

Several tertiary amines may be used in combination with the metal salts such as N,N-dimethyl aniline, N,N-diethyl aniline, N,N-dimethyl acetoacetamide, N,N-dimethyl p-toluidine, trithylamine, triethanolamine, and tertiary aromatic amines. Examples of suitable quaternary ammonium salts include but are not limited to stearyldimethylethylammonium ethylsulfate, stearamidopropyldimethyl-β-hydroxyethyl ammoniumnitrate, N, N,-bis(2-hydroxyethyl)-N-(3'-dodecyloxy-2'-hydroxypropyl) methylammonium methylsulfate, tricaprylmethyl ammonium chloride, ditallow dimethyl ammonium salt, tributyl ammonium methyl sulfate, trihexyltetradecylphosphonium bis(2,4,4-trimethylpentyl)phosphonate, trihexyltetradecylphosphonium bromide, trihexyltetradecylphosphonium chloride, trihexyltetradecylphosphonium decanoate, trihexyltetradecylphosphonium hexafluorophosphate, 3 (triphenylphosphonio)propane-1-sulfonate, 1-butylpyridinium bromide, 1-butylpyridinium chloride. Other tertiary fatty amines may also be incorporated such as ethoxylated amines derived from coco, soya, tallow or stearyl amines. Other accelerators that can also be added include but are not limited to 1,3-doketones such as acetylacetone, benzoylacetone, and the like. Mixtures of the above may be used.

The curing accelerators or promoters are preferably employed in amounts from about 0.0001 to about 1.0 percent by weight, more preferably from about 0.001 to 0.5 percent by weight, and most preferably from about 0.01 to 0.3 percent by weight of the vinyl-containing reaction products of the invention or their mixtures thereof.

Polymerization inhibitors that may also be included with the vinyl-containing reaction products of the invention or their mixtures include phenol, 2,6-di-tert-butyl-4-methyl phenol, hydroquinone (HQ), tolu-hydroquinone (THQ), bis-phenol "A" (BPA), naphthoquinone (NQ), p-benzoquinone (p-BQ), butylated hydroxy toluene (BHT), Hydroquinone monomethyl ether (HQMME), 4-ethoxyphenol, 4-propoxyphenol, and propyl isomers thereof, monotertiary butyl hydroquinone (MTBHQ), ditertiary Butyl hydroquinone (DTBHQ), tertiary butyl catechol (TBC), 1,2-dihydroxybenzene, 2,5-dichlorohydroquinone, 2-acetylhydroquinone, 1,4-dimercaptobenzene, 4-aminophenol, 2,3,5-trimethylhydroquinone, 2-aminophenol, 2-N,N,-dimethylaminophenol, catechol, 2,3-dihydroxyacetrophenone, pyrogallol, 2-methylthiophenol, 2,4,6-Tri(dimethylaminomethyl)phenol, dimetyl ketoxime, diethyl ketoxime, methylethyl ketoxime. Other substituted and un-substituted phenols and mixtures of the above.

Other polymerization inhibitors include stable hindered nitroxyl compounds such as N,N-di-tert-butylnitroxide; N,N-di-tert-amylnitroxide; N-tert-butyl-2-methyl-1-phenylpropylnitroxide; N-tert-butyl-1-diethyl phosphono-2,2-dimethyl propyl nitroxide; 2,2,6,6-tetramethyl-piperidinyloxy; 4-amino-2,2,6,6-tetramethyl-piperidinyloxy; 4-hydroxy-2,2,6,6-tetramethyl-piperidinyloxy; 4-oxo-2,2,6,6-tetramethyl-piperidinyloxy; 4-dimethylamino-2,2,6,6-tetramethyl-piperidinyloxy; 4-ethanoyloxy-2,2,6,6-tetramethyl-piperidinyloxy; 2,2,5,5-tetramethylpyrrolidinyloxy; 3-amino-2,2,5,5-tetramethylpyrrolidinyloxy; 2,2,4,4-tetramethyl-1-oxa-3-azacyclopentyl-3-oxy; 2,2,4,4-tetramethyl-1-oxa-3-pyrrolinyl-1-oxy-3-carboxylic acid; 2,2,3,3,5,5,6,6-octamethyl-1,4-diazacyclohexyl-1,4-dioxy; 4-bromo-2,2,6,6-tetramethyl-piperidinyloxy; 4-chloro-2,2,6,6-tetramethyl-piperidinyloxy; 4-iodo-2,2,6,6-tetramethyl-piperidinyloxy; 4-fluoro-2,2,6,6-tetramethyl-piperidinyloxy; 4-cyano-2,2,6,6-tetramethyl-piperidinyloxy; 4-carboxy-2,2,6,6-tetramethyl-piperidinyloxy; 4-carbomethoxy-2,2,6,6-tetramethyl-1-piperidinyloxy; 4-carbethoxy-2,2,6,6-tetramethyl-piperidinyloxy; 4-cyano-4-hydroxy-2,2,6,6-tetramethyl-piperidinyloxy; 4-methyl-2,2,6,6-tetramethyl-1-piperidinyloxy; 4-carbethoxy-4-hydroxy-2,2,6,6-tetramethyl-piperidinyloxy; 4-hydroxy-4-(1-hydroxypropyl)-2,2,6,6-tetramethyl-piperidinyloxy; 4-methyl-2,2,6,6-tetrankthyl-1,2,5,6-tetrahydropyridinyloxyl, and the like. Additional useful stable hindered nitrxyl inhibitors are described on patent publications WO 01/40404 A1, WO01/40149 A2, WO 01/42313 A1, U.S. Pat. Nos. 4,141,883, 6,200,460 B1, 5,728,872, incorporated here in their entirety.

The vinyl-containing reaction products in accordance with the invention can be used individually or as a mixture, where the term mixture is to be understood broadly. It includes both mixtures of different vinyl-containing reaction products of this invention as well as mixtures of copolymers prepared by condensation, addition polymerization and radical polymerization, such polymers include: saturated polyester resins (e.g., resins employed in hot melt adhesives, low profile agents and powder coatings), unsaturated polyesters (e.g., resins used in forming molded articles), aliphatic and aromatic polyethers, vinyl ester resins (e.g., resins used in filament winding and open and closed molding), polyurethanes, styrenic resins, acrylic resins, butadiene resins, and mixtures of any of the above.

Suitable initiators used in curing the vinyl-containing reaction products of the invention and/or their mixtures may also encompass photoinitiators which may be activated upon exposure to a source of energy such as infrared, visible, electron beam, or ultraviolet radiation. Examples of suitable photoinitiators include, but are not limited to, an aliphatic or aromatic diketone and a reducing agent (e.g., benzil and dimethyl benzyl amine); vicinal polyketaldonyl compounds (e.g., diacetyl benzil and benzil ketal); 6-carbonyl alcohols (e.g., benzoin); acyloin ethers (e.g., benzoin methyl ether); polynuclear quinones (e.g., 9,10-antraquinone), and benzophenone. Preferably, the amount of photoinitiator ranges from about 0.005 to 5 percent based on the weight of the resin or their mixtures. Suitable commercial photoinitiators include those available from Ciba-Geigy Corporation sold under the tradenames Irgacure 500, Irgacure 369, Irgacure 1700, Darocur 4265, and Irgacure 819. It should be appreciated that other commercial photoinitiators may be used for the purposes of the invention.

Flame retardant compounds may also be included in the present invention such as those described in numerous publications and patents known to those of skill in the art. Useful in formulating flame retardant compositions are, for example, brominated flame retardants compounds. Preferred flame retardant compounds include, for example, brominated compounds such as 1,3,5-tris(2,4,6-tribromophenoxy) triazine, brominated polystyrene, brominated cyclodecane, brominated Bisphenol-A diglycidyl ether, tetrabromobisphenol-bis(allyl ether), ethylene bis(tetrabromophthaliimide), tetrabromophthaliimide, and dibromoethyldibromocyclohexane. Other flame retardants may include phosphorus containing intermediates such as alkyl or aryl or mixed aromatic-aliphatic phosphate esters such as Triphenyl phosphate, tricresyl phosphate, diphenyl-(2-ethyl hexyl)phosphate, tris(2-chlorosiopropyl)phosphate, trithylphosphate, tri-n-butyl phosphate, tri-isobutyl phosphate, di-n-butyl phosphate, tris(allyphenylphosphate), tris(2-methoxy-4-allylphosphate), tris(2-propylphenyl)phosphate, tri(4-vinylphenyl)phosphate, bis(diphenylphosphate ester)s of bisphenols such as Bisphenol-A, resorcinol or hydroquinone, resorcinol bis(2,6-dixylenyl phosphate), bis(diphenylphosphoramide)s, phosphonates such as dimethymethyl phosphonate, dimethylpropyl phosphonate, phosphites such as dimethyl phosphite, diethyl phosphite, trimethyl phosphite, triethyl phosphite, melamine polyphosphate, melamine cyanurate, metal phosphites, inorganic metal phosphites, red phosphorus, ammonium polyphosphate, and the like and mixtures thereof.

Addition of fiber(s) provides a means for strengthening or stiffening the polymerized cured composition forming the substrate. The types often used are: Inorganic crystals or polymers, e.g., glass fiber, quartz fibers, silica fibers, fibrous ceramics, e.g., alumina-silica (refractory ceramic fibers); boron fibers, silicon carbide, silicon carbide whiskers or monofilament, metal oxide fibers, including alumina-boric-silica, alumina-chromia-silica, zirconia-silica, and others.

Organic polymer fibers, e.g., fibrous carbon, fibrous graphite, acetates, acrylics (including acrylonitrile), aliphatic polyamides (e.g. nylon), aromatic polyamides, olefins (e.g., polypropylenes, polyesters, ultrahigh molecular weight polyethylenes), polyurethanes (e.g., Spandex), alpha-cellulose, cellulose, regenerated cellulose (e.g., rayon), jutes, sisal, vinyl chlorides, vinylidenes, flax, and thermoplastic fibers; metal fibers, e.g., aluminum, boron, bronze, chromium, nickel, stainless steel, titanium or their alloys; and "whiskers", single, inorganic crystals.

Suitable filler(s) non-fibrous are inert, particulate additives being essentially a means of reducing the cost of the final product while often reducing some of the physical properties of the polymerized cured compound. Fillers used in the invention include calcium carbonate of various form and origins, silica of various forms and origins, silicates, silicon dioxides of various forms and origins, clays of various forms and origins, feldspar, kaolin, flax, zirconia, calcium sulfates, micas, talcs, wood in various forms, glass (milled, platelets, spheres, micro-balloons), plastics (milled, platelets, spheres, micro-balloons), recycled polymer composite particles, metals in various forms, metallic oxides or hydroxides (except those that alter shelf life or viscosity), metal hydrides or metal hydrates, carbon particles or granules, alumina, alumina powder, aramid, bronze, carbon black, carbon fiber, cellulose, alpha cellulose, coal (powder), cotton, fibrous glass, graphite, jute, molybdenum, nylon, orlon, rayon, silica amorphous, sisal fibers, fluorocarbons and wood flour.

Other reinforcements know to one skill in the art may include inorganic and organic woven or non-woven fabrics such as glass, quartz, and the like. Reinforcement may be in the form of glass roving cloth, glass cloth, chopped glass, hollow glass fibers, glass mat, glass surfacing mat, and non-woven glass fabric, ceramic fiber fabrics, and metallic fiber fabrics. Organic fabrics include aramid, carbon fiber, cellulose, alpha cellulose, cotton, fibrous jute, nylon, orlon, rayon, sisal fibers, fluorocarbon, aromatic polyamides, olefins (e.g., polypropylenes, polyesters, ultrahigh molecular weight polyethylenes), polyurethanes (e.g., Spandex), alpha-cellulose, cellulose, regenerated cellulose and mixtures thereof.

Additional additives known by the skilled artisan may be employed in the laminating resin composition of the present invention including, for example, thixotropic agents, paraffin waxes, fatty acids, fatty acid derivatives, lubricants, and shrink-reducing additives. Various percentages of these additives can be used in the laminating resin composition.

Thermoplastic polymeric materials which reduce shrinkage during molding can also be included in the composition of the invention. These thermoplastic materials can be used to produce molded articles having surfaces of improve smoothness. The thermoplastic resin is added into the unsaturated polyester composition according to the invention in order to suppress shrinkage at the time of curing. The thermoplastic resin is provided in a liquid form and is prepared in such a manner that 30 to 45% by weight of the thermoplastic resin is dissolved in 55 to 70% by weight of polymerizable monomer having some polymerizable double bond in one molecule. Examples of the thermoplastic resin may include styrene-base polymers, polyethylene, polyvinyl acetate base polymer, polyvinyl chloride polymers, polyethyl methacrylate, polymethyl methacrylate or copolymers, ABS copolymers, Hydrogenated ABS, polycaprolactone, polyurethanes, butadiene styrene copolymer, and saturated polyester resins. Additional examples of thermoplastics are copolymers of: vinyl chloride and vinyl acetate; vinyl acetate and acrylic acid or methacrylic acid; styrene and acrylonitrile; styrene acrylic acid and allyl acrylates or methacylates; methyl methacrylate and alkyl ester of acrylic acid; methyl methacrylate and styrene; methyl methacrylate and acrylamide. In the resin composition according to the invention, 5 to 50% by weight of the liquid thermoplastic resin is mixed; preferably 10 to 30% by weight of the liquid thermoplastic resin is mixed.

Low profile agents (LPA) are composed primarily of thermoplastic polymeric materials. These thermoplastic intermediates present some problems remaining compatible with almost all types of thermosetting resin systems. The incompatibility between the polymeric materials introduces processing difficulties due to the poor homogeneity between the resins. Problems encountered due to phase separation in the resin mixture include, scumming, poor color uniformity, low surface smoothness and low gloss. It is therefore important to incorporate components that the will help on stabilizing the resin mixture to obtain homogeneous systems that will not separate after their preparation. For this purpose, a variety of stabilizers can be used in the present invention which includes block copolymers from polystyrene-polyethylene oxide as those described in U.S. Pat. Nos. 3,836,600 and 3,947,422. Block copolymer stabilizers made from styrene and a half ester of maleic anhydride containing polyethylene oxide as described in U.S. Pat. No. 3,947,422. Also useful stabilizers are saturated polyesters prepared from hexanediol, adipic acid and polyethylene oxide available from BYK Chemie under code number W-972.

Additional additives include phenolic type antioxidants as those described in pages 1 to 104 in "Plastic additives", by R. Gachter and Müller, Hanser Publishers, 1990. Include also are Mannich type antioxidants, specially phenols and naphthols, suitable for the purpose herein include hindered aromatic alcohols, such as hindered phenols and naphthols, for example, those described in U.S. Pat. No. 4,324,717, the disclosure of which is incorporated herein by reference in its entirety.

Additional additives known by the skilled artisan may be employed in the resin composition of the present invention including, for example, pigments, dyes, paraffins, lubricants, flow agents, air release agents, flow agents, wetting agents, UV stabilizers, and shrink-reducing additives. Various percentages of these additives can be used in the resin compositions.

Internal release agents are preferably added to the molding composition according to the invention. Aliphatic metal salts such as zinc stearate, magnesium stearate, calcium stearate or aluminum stearate can be used as the internal release agent. The amount of internal release agent added is in the range of 0.5 to 5.0% by weight, more preferably in the range of from 0.4% to 4.0% by weight. Hence, stable release can be made at the time of demolding without occurrence of any crack on the molded product.

In some embodiments of the present invention, composite articles may be formed by applying a curable thermosetting composition to a substrate or a reinforcing material, such as by impregnating or coating the substrate or reinforcing material, and curing the curable composition. The properties accomplished from these materials can provide composite systems that can be used in various applications which can include molding, lamination, infusion, pultrusion, encapsulation, coatings, adhesives, prepregs, electrical and electronic components.

The following examples are provided to illustrate the present invention, and should not be construed as limiting thereof.

EXAMPLES

Example 1

1st Stage: In a 3 liter four-neck glass flask equipped with a thermometer, stainless steel stirrer, nitrogen inlet, and condenser were placed 520 g of neopentyl glycol, 280 g of ethylene glycol, 580 g of fumaric acid, 200 g of trimethylol propane diallylether and inhibitors. The materials are reacted in a nitrogen using a sparge at 180° C. for about 6-8 hours to reach the 1st stage endpoints of acid number of 10 or less.

2nd Stage: The reactor is cooled down to 100° C. and then additional amount of inhibitors are added together with 390 g of Toluene, 810 g of methacrylic acid, and 9 g of methane sulfonic acid. The temperature is gradually increased to 115° C., and maintained to remove the water produced from the reaction. After water distillation is completed or the water being removed slows down, toluene is distilled off. As soon as the toluene distillation slows down, vacuum is applied to remove any residual solvent.

3rd Stage: The temperature is then reduced to 60° C. and 108 g of liquid epoxy is added. The reaction is continued at 50° C. to 60° C. for one hour and the mixture is then cool to room temperature. The obtained resin was a clear liquid; the resin is identified as Resin 1 and its properties are summarized in Table 1.

Example 2

1st Stage: In a 5 liter four-neck glass flask equipped with a thermometer, stainless steel stirrer, nitrogen inlet, and condenser were placed 933 g of diethylene glycol, 546 g of ethylene glycol, and 1021 g of fumaric acid. The materials are reacted in a nitrogen atmosphere using a sparge at 220° C. until an acid number of 10 or less.

2nd Stage: The reactor is then cooled to 100° C. and then added inhibitors, 680 g of toluene, 1320 g of methacrylic acid, and 16 g of methane sulfonic acid. The temperature is gradually increased to 115° C., and maintained to remove the water produced from the reaction. After water distillation is completed or the water being removed slows down, toluene is distilled off. As soon as the toluene distillation slows down, vacuum is applied to remove any residual solvent.

3rd Stage: The temperature is then reduced to 60° C. and 190 g of liquid epoxy is added. The reaction is continued at 50° C. to 60° C. for one hour and the mixture is then cool to room temperature. The obtained resin was a clear liquid; the resin is identified as Resin 2 and its properties are summarized in Table 1.

Example 3

1st Stage: In a 5 liter four-neck glass flask equipped with a thermometer, stainless steel stirrer, nitrogen inlet, and condenser were placed 477 g of diethylene glycol, 279 g of ethylene glycol, 936 g of neopentyl glycol, 1044 g of fumaric acid, and inhibitors. The materials are reacted in a nitrogen atmosphere using a sparge at 220° C. until an acid number of 10 or less.

2nd Stage: The reactor is then cooled to 100° C. and then added inhibitors together with 720 g of toluene, 1400 g of methacrylic acid, and 16 g of methane sulfonic acid. The temperature is gradually increased to 115° C., and maintained to remove the water produced from the reaction. After water distillation is completed or the water being removed slows down, toluene is distilled off. As soon as the toluene distillation slows down, vacuum is applied to remove any residual solvent.

3rd Stage: The temperature is then reduced to 60° C. and 195 g of liquid epoxy is added. The reaction is continued at 50° C.-60° C. for at least one hour and the mixture is then cooled to room temperature. The obtained resin was a clear liquid; the resin is identified as Resin 3 and its properties are summarized in Table 1.

Example 4

1st Stage: In a 5 liter four-neck glass flask equipped with a thermometer, stainless steel stirrer, nitrogen inlet, and condenser were placed 550 g of ethylene glycol, 936 g of neopentyl glycol, 1044 g of fumaric acid, and inhibitors. The materials are reacted in a nitrogen atmosphere using a sparge at 180° C. until an acid number of 10 or less.

2nd Stage: The reactor is then cooled to 100° C. and then added inhibitors together with 720 g of Toluene, 1385 g of methacrylic acid, and 16 g of methane sulfonic acid. The temperature is gradually increased to 115° C., and maintained to remove the water produced from the reaction. After water distillation is completed or the water being removed slows down, toluene is distilled off. As soon as the toluene distillation slows down, vacuum is applied to remove any residual solvent.

3rd Stage: The temperature is then reduced to 60° C. and 195 g of liquid epoxy is added. The reaction is continued at 50° C. to 60° C. for at least one hour and the mixture is then cooled to room temperature. The obtained resin was a clear liquid; the resin is identified as Resin 4 and its properties are summarized in Table 1.

Example 5

1st Stage: In a 5 liter four-neck glass flask equipped with a thermometer, stainless steel stirrer, nitrogen inlet, and condenser were placed 1,099 g of ethoxylated Bisphenol "A" (BPA2EO), and inhibitors. 314 g of toluene followed by 662 g of methacrylic acid, and 6.5 g of methane sulfonic acid were then added. The temperature is gradually increased to 115° C., and maintained to remove the water produced from the reaction. After water distillation is completed, toluene is distilled off. As soon as the toluene distillation slows down, vacuum is applied to remove any residual solvent.

2nd Stage: The temperature is then reduced to 60° C. and 45.4 g of liquid epoxy together with inhibitors are added. The reaction is continued at 50° C.-60° C. for at least one hour and the mixture is then cooled to room temperature. The obtained resin was a clear liquid with a viscosity of about 1,100 cps. The resin was divided into two portions. One portion was mixed with 50% by weight of trimethylolpropane triacrylate (TMPTA) and is identified as resin 5A. The second portion was mixed with 25% by weight of TMPTA and is identified as resin 5B. Properties for resins 5A and 5B are summarized in Table 3.

Sample Testing of Resins 1-4

Tests were conducted on the resulting vinyl-containing compounds which included; viscosity measured using a Brookfield LV viscometer, Spindle #2 at 30 rmp and at 25° C. The room temperature gel time (RTG), total time to Peak (TTP) and room temperature peak exotherm (Peak Exo) were measured as follow: 0.15 g 12% Cobalt and 0.25 g dimethylacetoacetamide (DMAA) were added to 100 g of the vinyl-containing intermediate. To this mixture was added 1.25 g of methylethyl ketone peroxide. The results are summarized in Table 1.

TABLE 1

Resin Properties

| Resin# | Acid Value | Viscosity (cps) | Gardner Color | RTG (min.) | TTP (min.) | Peak Exo ° C. |
|---|---|---|---|---|---|---|
| 1 | 26 | 544 | 3 | 4.2 | 8.7 | 152 |
| 2 | 30 | 510 | 3 | 9.5 | 16.0 | 152 |
| 3 | 21 | 226 | 2 | 6.0 | 10.9 | 148 |
| 4 | 20 | 460 | 2 | 5.6 | 9.8 | 150 |

Sample Testing of Resins 5A and 5B

Tests were conducted on samples 5A and 5B included; viscosity measured using a Brookfield RV viscometer, Spindle #3 at 20 rmp and at 25° C. The room temperature gel time (RTG), total time to Peak (TTP) and room temperature peak exotherm (Peak Exo) were tested with a promotion package as indicated in Table 3. To this mixture was added 1.25 g of Cumene Hydroperoxide. The results are summarized in Table 3.

Clear castings were prepared by adding 1.0% Benzoyl Peroxide (BPO) to the vinyl-containing compounds, and curing was then performed at 130° F. (54.4° C.) for 16 hours, and post-cured for 2 hours at 180° F. (82.2° C.) and 2 hours at 250° F. (121.1° C.).

Heat distortion temperature (HDT) and physical properties. In the examples, mechanical properties were analyzed at room temperature using an Instron machine, resin tensile strength was measured in accordance with ASTM Standard D-638; flexural strength was measured in accordance with ASTM Standard D-79; barcol hardness was determined in accordance with ASTM Standard D-2583; elongation was measured in accordance with ASTM Standard D-638; heat distortion was measured in accordance with ASTM Standard D-648; and Barcol hardness determined according to ASTM 2583-01 test methods. The results are summarized in Table 2.

TABLE 2

Physical Properties of Clear-Cast Resins

| | Resin | | | |
|---|---|---|---|---|
| | 1 | 2 | 3 | 4 |
| Barcol Hardness | 55-58 | 54-56 | 48-52 | 49-52 |
| HDT (° C.) | >200 | 184 | 189 | 204 |
| Tensile Strength, psi | 7,604 | 8,533 | 7,100 | 5,749 |
| Tensile Modulus, kpsi | 536 | 524 | 469 | 550 |
| % Elongation at Break | 1.7 | 1.9 | 1.7 | 1.2 |
| Flexural Strength (psi) | 14,658 | 20,065 | 15,177 | 15,707 |
| Flexural Modulus kpsi | 544 | 558 | 548 | 548 |

TABLE 3

Physical Properties of Clear Cast Resins in Example 5A and 5B.

| | EXAMPLE 5A | EXAMPLE 5A | EXAMPLE 5B | EXAMPLE 5B |
|---|---|---|---|---|
| VISCOSITY, cps. | 410.00 | 410.00 | 1,020 | 1,020 |
| DMA, % | 0.30 | NA | 0.30 | NA |
| DMPT, % | NA | 0.10 | NA | 0.10 |
| CHP, % | 1.00 | 1.00 | 1.00 | 1.00 |
| WXP-126, % | 0.20 | 0.10 | 0.20 | 0.10 |
| GEL TIME, min. | 15.00 | 18.00 | 10.00 | 12.00 |
| TOTAL TIME TO PEAK, min. | 19.00 | 22.50 | 14.50 | 16.75 |
| PEAK EXOTHERM, ° C. | 215.00 | 223.40 | 176.60 | 174.60 |
| BARCOL HARDNESS | 42-45 | NA | 40-44 | NA |
| HDT (° C.) | 150.00 | NA | 176.00 | NA |

TABLE 3-continued

Physical Properties of Clear Cast Resins in Example 5A and 5B.

|  | EXAMPLE 5A | EXAMPLE 5A | EXAMPLE 5B | EXAMPLE 5B |
|---|---|---|---|---|
| TENSILE STRNEGTH, Psi. | 4900.00 | NA | 5800 | NA |
| TENSILE MODULUS, Kpsi. | 480.00 | NA | 560 | NA |
| ELONGATION AT BREAK, % | 1.20 | NA | 1.1 | NA |

DMA—dimethyl anyline; DMPT—dimethyl p-toluidine; CHP—cumene hydroperoxide—Norox CHP; WXP-126—Borchi OXY-cure WXP-126—is an Iron Complex available from OMG Company.

As can be seen from the data presented above, the vinyl-containing polyester resins do not include any styrene or other reactive diluents (monomers) in their compositions, and they are liquid resins at room temperature with viscosity ranging from 230 to 550 cps. The vinyl-containing polyester resins have high reactivity and fast room temperature cure with initiator. In addition, the clear casting samples prepared from the vinyl containing polyester resins cured with 1% benzyl peroxide have high HDT up to greater than 200° C., all of which may be important in the applications require good heat resistance and environmental friendly.

Although selected embodiments of the present invention have been disclosed for illustrative purposes, those skilled in the art will appreciate that various modifications, additions and substitutions are possible, without departing from the scope and spirit of the invention as disclosed in the accompanying claims.

What is claimed:

1. A process for forming a thermosetting resin having a heat distortion temperature (HDT) of greater than 150° C., wherein the process is conducted in a nitrogen atmosphere and comprises the steps of:
    a) reacting a polycarboxylic acid and/or anhydride with a polyhydric alcohol to provide a hydroxyl containing intermediate, wherein the polycarboxylic acid and/or anhydride comprises fumaric acid;
    b) reacting the hydroxyl-containing intermediate with a vinyl-containing organic acid or vinyl-containing alkyl ester in the presence of an esterification catalyst and a polymerization inhibitor;
    c) reacting any residual vinyl-containing organic acid and esterification catalyst with an epoxide to provide a thermosetting resin having an HDT of greater than 150° C.

2. The process of claim 1, wherein the HDT is greater than or equal to 180° C.

3. The process of claim 1, wherein the polycarboxylic acid and/or anhydride further comprises one or more anhydrides selected from the group consisting of propionic anhydride, maleic anhydride, phthalic anhydride, tetrabromophthalic anhydride, succinic anhydride, tetrahydrophthalic anhydride, citraconic anhydride, itaconic anhydride, aryl-, alkyl-, and halogen-substituted derivatives thereof and mixtures of any thereof.

4. The process of claim 1, wherein the polycarboxylic acid and/or anhydride further comprises a polycarboxylic acid and/or anhydride monomer containing no carbon-carbon unsaturated functionality, said monomer selected from the group consisting of isophthalic acid, terephthalic acid, adipic acid, cyclohexane dicarboxylic acid, succinic anhydride, adipic acid, sebacic acid, azealic acid, malonic acid and alkenyl succinic acids and anhydrides thereof.

5. The process of claim 1, wherein the polycarboxylic acid i& and/or anhydride further comprises a polycarboxylic acid and/or anhydride selected from the group consisting of 1,2,4-benzenetricarboxylic acid, 1,3,5-benzene tricarboxylic acid, 1,2,4-cyclohexane tricarboxylic acid, 2,5,7-naphthalene tricarboxylic acid, 1,2,4-naphthalene tricarboxylic acid, 1,3,4-butane tricarboxylic acid, 1,2,5-hexane tricarboxylic acid, 1,3-dicarboxyl-2-methyl-2-carboxymethylpropane, tetra(carboxymethyl)methane, 1,2,7,8-octane tetracarboxylic acid, anhydrides thereof and mixtures of any thereof.

6. The process of claim 1, wherein the polyhydric alcohol is selected from the group consisting of ethylene glycol, diethylene glycol, neopentyl glycol, dibromoneopentyldiol, 2-methyl-1,3-propanediol, 2,2 4-trimethyl-1,3-pentadiol, 2-butyl-2-ethyl 1,3-propanediol, polyethoxylated bisphenol A, polypropoxylated bisphenol A, 1,4-cyclohexane dimethanol, trimethylol propane diallylether, propylene glycol, dipropylene glycol, 1,3-butanediol, 1,4-butanediol, 1,3 hexanediol, 1,3-butylene glycol, 1,6-hexanediol, hydrogeneated bisphenol A, 1,4-cyclohexanol, ethylene oxide adducts of bisphenols, propylene oxide adducts of bisphenols, sorbitol, 1,2,3,6-hexatetrol, 1,4-sorbitan, pentaerythritol, dipentaerythritol, tripentaerythritol, sucrose, 1,2,4-butanetriol, 1,2,5-pentanetriol, glycerol, 2-methyl-propanetriol, 2-methyl-1,2,4-butanetriol, trimethylol ethane, trimethylol propane 1,3,5-trihydroxyethyl benzene, halogen and phosphorus containing derivatives thereof and mixtures of any thereof.

7. The process of claim 1, wherein the weight equivalent ratio of polycarboxylic acid or anhydride to polyhydric alcohol is in a range from about 1:1 to about 1:10.

8. The process of claim 1, wherein the polymerization inhibitor is one or more selected from the group consisting of phenothiazine, phenol, 2,6-di-tert-butyl-4-methyl phenol, hydroquinone (HQ), tolu-hydroquinone (THQ), bisphenol A (BPA), triphenyl antimony, naphthoquinone (NQ), p-benzoquinone (p-BQ), butylated hydroxy toluene (BHT), hydroquinone monomethyl ether (HQMME), 4-ethoxyphenol, 4-propoxyphenol, monotertiary butyl hydroquinone (MT-BHQ), ditertiary butyl hydroquinone (DTBHQ), tertiary butyl catechol (TBC), 1,2-dihydroxybenzene, 2,5-dichlorohydroquinone, 2-acetylhydroquinone, 1,4-dimercaptobenzene, 2,3,5-trimethylhydroquinone, 2-aminophenol, 2-N,N,-dimethylaminophenol, catechol, 2,3-dihydroacetophenone, pyrogallol, 2-methylthiophenol and mixtures of any thereof.

9. The process of claim 1, wherein the polymerization inhibitor is a stable hindered nitroxyl compound.

10. The process of claim 9, wherein the stable hindered nitroxyl compound is selected from the group consisting of N,N-di-tert-butylnitroxide; N,N-di-tert-amylnitroxide; N-tert-butyl-2-methyl-1-phenyl-propylnitroxide; N-tertbutyl-1-diethyl phosphono-2,2-dimethyl propyl nitroxide; 2,2,6,6-tetramethyl-piperidinyloxy; 4-amino-2,2,6,6-tetramethyl-piperidinyloxy; 4-hydroxy-2,2,6,6-tetramethyl-piperidinyloxy; 4-oxo-2,2,6,6-tetramethyl-piperidinyloxy; 4-dimethylamino-2,2,6,6-tetramethyl-piperidinyloxy; 4-ethanoyloxy-2,2,6,6-tetramethyl-piperidinyloxy; 2,2,5,5- tetramethylpyrrolidinyloxy; 3-amino-2,2,5,5-tetramethyl-pyrrolidinyloxy; 2,2,4,4-tetramethyl-1-oxa-3-azacyclopentyl-3-oxy; 2,2,4,4-tetramethyl-1-oxa-3-pyrrolinyl-1-oxy-3-carboxylic acid; 2,2,3,3,5,5,6,6-octamethyl-1,4-diazacyclohexyl-1,4-dioxy; 4-bromo-2,2,6,6-tetramethyl-piperidinyloxy; 4-chloro-2,2,6,6-tetramethyl-piperidinyloxy; 4-iodo-2,2,6,6-tetramethyl-piperidinyloxy; 4-fluoro-2,2,6,6-tetramethyl-piperidinyloxy; 4-cyano-2,2,6,6-tetramethyl-piperidinyloxy; 4-carboxy-2,2,6,6-tetramethyl-piperidinyloxy; 4-cyano-4-hydroxy-2,2,6,6-tetramethyl-piperidinyloxy; 4-methyl-2,2,6,6-tetramethyl-1-piperidinyloxy; 4-carbethoxy-2,2,6,6-tetramethyl-piperidinyloxy; 4-carboxy-4-hydroxy-2,2,6,6-tetramethyl-piperidinyloxy; 4-hydroxy-4-(1-hydroxypropyl)-2,2,6,6-tetramethy 1-piperidinyloxy; and 4-methyl-2,2,6,6-tetraethyl-1,2,5,6-tetrahydropyridinyloxy.

11. The process of claim 1, wherein the esterification catalyst is an acid esterification catalyst.

12. The process of claim 11, wherein the acid esterification catalyst is one or more selected from the group consisting of sulfuric acid, hydrochloric acid, alkyl sulfonic acids, 2-methyl-1-phenol-4-sulfonic acid, alkylbenzene sulfonic acids and mixtures of any thereof.

13. The process of claim 11, wherein the acid esterification catalyst is selected from the group consisting of toluenesulfonic acid, benzenesulfonic acid, xylenesulfonic acid, methanesulfonic acid and mixtures of any thereof.

14. The process of claim 1, wherein the esterification catalyst is a metal containing catalyst.

15. The process of claim 14, wherein the metal containing catalyst is an organo tin catalyst.

16. The process of claim 14, wherein the metal containing catalyst is one or more selected from the group consisting of dimethyl tin oxide, dibutyl tin diacetate, dibutyl tin di-2-ethylhexoate, dibutyl tin dilaurate, dibutyl tin oxide, dimethyl tin dichloride, sodium and potassium alkoxides, zinc and titanium alkoxides.

17. The process of claim 1, wherein the weight ratio of vinyl-containing organic acid to polyhydric alcohol is in a range from about 1:1 to about 10:1 by weight.

18. The process of claim 1, wherein step b) is in the presence of an azeotropic agent, wherein the azeotropic agent is a solvent and has a boiling point range from about 70° C. to about 120° C.

19. The process of claim 18, wherein the azeotropic solvent is present in the amount ranging from about 5% to 50% based on the weight of the total reaction mixture.

20. The process of claim 1, wherein the esterification is carried out in a nitrogen atmosphere at atmospheric pressure.

21. The process of claim 1, wherein the esterification is carried out in a nitrogen atmosphere at subatmospheric or reduced pressure.

22. The process of claim 1, wherein the epoxide is a polyepoxide.

23. The process of claim 22, wherein the polyepoxide is a glycidyl ether of a polyhydric alcohol or a polyhydric phenol.

24. The process of claim 1, wherein a second catalyst is provided to catalyze the reaction between the liquid epoxy and residual vinyl-containing organic acid and esterification catalyst.

25. The process of claim 24, wherein the second catalyst is an organophosphonium salt, a tertiary amine, a quarternary ammonium salt, or a combination thereof.

26. The process of claim 24, wherein the second catalyst is one or more selected from the group consisting of organophosphonium salts, 2,4,6-tri(dimethylaminomethyl)phenol [DMP-30], tetramethylammonium chloride tetramethylammonium hydroxide, tetramethylammonium bromide, tetramethylammonium hydrogensulfate, benzyltrimethylammonium chloride, benzyltrimethylammonium bromide, benzyltrimethylammonium hydrogen sulfate, benzyltributylammonium chloride, benzyltributylammonium bromide, benzyltributylammonium hydrogen sulfate, 1,4-diazabicyclo[2.2.2]octane, diazabicyclo[4.3.0]-nonene-(5), 2-methyl imidazol, piperidine, morpholine, triethyl amine, tributyl amine, and mixtures of any thereof.

27. The process of claim 24, wherein the second catalyst is a phosphorous containing compound and is one or more selected from the group consisting of triphenyl phosphine, tributyl phosphine, tributylphosphonium acetate, tributylphosphonium bromide, tributylphosphonium chloride, tributylphosphonium fluoride, tributylphosphonium iodide, tetraphenylphosphonium chloride, tetraphenylphosphonium bromide, tetraphenylphosphonium acetate, and mixtures of any thereof.

28. The process of claim 1, wherein the reaction between any residual vinyl-containing organic acid and esterification catalyst with a epoxide is carried out at a temperature ranging from about 15° C. and about 120° C.

29. The process of claim 1, wherein the reaction between the hydroxyl-containing intermediate with a vinyl-containing organic acid or vinyl-containing alkyl ester in the presence of an esterification catalyst, and a polymerization inhibitor further comprises a free radical scavenger, an antioxidant or a combination thereof.

30. A thermosetting resin prepared by the process of claim 1.

31. The thermosetting resin of claim 30, further comprising an additional additive selected from any one of the group consisting of flame retardant compounds, fibers, fillers, reinforcements, thixotropic agents, paraffin waxes, fatty acids, fatty acid derivatives, lubricants, shrink-reducing additives, thermoplastic polymeric materials, low profile agents (LPA), antioxidants, pigments, dyes, paraffins, lubricants, flow agents, air release agents, wetting agents, UV stabilizers, internal release agents, and mixtures of any thereof.

32. The thermosetting resin of claim 30, further comprising a flame retardant compound.

33. The process of claim 1, wherein the polycarboxylic acid and/or anhydride consists of fumaric acid.

34. The process of claim 33, wherein the polyhydric alcohol comprises ethylene glycol and neopentyl glycol.

* * * * *

UNITED STATES PATENT AND TRADEMARK OFFICE
CERTIFICATE OF CORRECTION

PATENT NO. : 10,544,299 B2  
APPLICATION NO. : 14/090453  
DATED : January 28, 2020  
INVENTOR(S) : Hildeberto Nava et al.

Page 1 of 1

It is certified that error appears in the above-identified patent and that said Letters Patent is hereby corrected as shown below:

In the Claims

Claim 5, Column 20, Line 12, "i& and/or" should be changed to --and/or--.

Signed and Sealed this  
Thirty-first Day of March, 2020

Andrei Iancu  
*Director of the United States Patent and Trademark Office*